United States Patent
Jain et al.

[11] Patent Number: 5,906,675
[45] Date of Patent: May 25, 1999

[54] AIR PURIFICATION PROCESS

[75] Inventors: Ravi Jain, Bridgewater; James K. Tseng, Berkeley Heights, both of N.J.

[73] Assignee: The BOC Group, Inc., Murray Hill, N.J.

[21] Appl. No.: 08/940,319

[22] Filed: Sep. 30, 1997

[51] Int. Cl.$^6$ .......................... B01D 53/047; B01D 53/26
[52] U.S. Cl. .................................. 95/99; 95/101; 95/105; 95/106; 95/120; 95/139; 95/143
[58] Field of Search ........................ 95/97–106, 122–126, 95/139, 140, 143, 114, 115, 117–121

[56] References Cited

U.S. PATENT DOCUMENTS

| | | | |
|---|---|---|---|
| 3,037,338 | 6/1962 | Thomas | 95/104 |
| 3,085,379 | 4/1963 | Kiyonaga et al. | 95/97 X |
| 3,594,983 | 7/1971 | Yearout | 95/97 |
| 3,738,084 | 6/1973 | Simonet et al. | 95/125 X |
| 4,233,038 | 11/1980 | Tao | 95/104 |
| 4,249,915 | 2/1981 | Sircar et al. | 95/99 |
| 4,264,340 | 4/1981 | Sircar et al. | 95/99 |
| 4,472,178 | 9/1984 | Kumar et al. | 95/99 |
| 4,711,645 | 12/1987 | Kumar | 95/98 |
| 4,770,676 | 9/1988 | Sircar et al. | 95/99 |
| 4,784,672 | 11/1988 | Sircar | 95/98 X |
| 5,110,569 | 5/1992 | Jain | 95/97 X |
| 5,156,657 | 10/1992 | Jain et al. | 95/101 |
| 5,198,001 | 3/1993 | Knebel et al. | 95/126 X |
| 5,232,474 | 8/1993 | Jain | 95/97 |
| 5,486,227 | 1/1996 | Kumar et al. | 95/99 X |
| 5,531,808 | 7/1996 | Ojo et al. | 95/96 |
| 5,571,309 | 11/1996 | Kumar | 95/99 |
| 5,614,000 | 3/1997 | Kalbassi et al. | 95/96 |
| 5,647,891 | 7/1997 | Blizzard et al. | 95/99 |
| 5,656,068 | 8/1997 | Smolarek et al. | 95/102 X |
| 5,674,311 | 10/1997 | Notaro et al. | 95/96 |
| 5,728,198 | 3/1998 | Acharya et al. | 95/123 X |

*Primary Examiner*—Robert Spitzer
*Attorney, Agent, or Firm*—Coleman R. Reap; Salvatore P. Pace

[57] ABSTRACT

An air prepurification process carried out in a battery of three adsorption vessels arranged in parallel. The process includes three steps: a first step in which non-steady state PSA is carried out in the first and second vessels operated in alternating adsorption and bed regeneration mode while the adsorbent in the third vessel undergoes thermal regeneration; a second step in which non-steady state PSA is carried out in the second and third vessels operated in alternating adsorption and bed regeneration modes while the adsorbent in the first vessel undergoes thermal regeneration; and a third step in which non-steady state PSA is carried out in the first and third vessels operated in alternating adsorption and bed regeneration modes while the adsorbent in the second vessel undergoes thermal regeneration. Each vessel contains at least two adsorbent layers, including a first layer of activated alumina, which adsorbs substantially all moisture and some carbon dioxide from the feed air, and a second layer of zeolite, which adsorbs substantially all of the remaining carbon dioxide in the feed air. The feed air may be passed through beds of hydrogen oxidation and carbon monoxide oxidation catalysts positioned between the first and second layers, to convert any hydrogen and carbon monoxide in the feed air to water vapor and carbon dioxide, respectively, these components being removed from the feed air as it passes through the layer of zeolite.

16 Claims, 1 Drawing Sheet

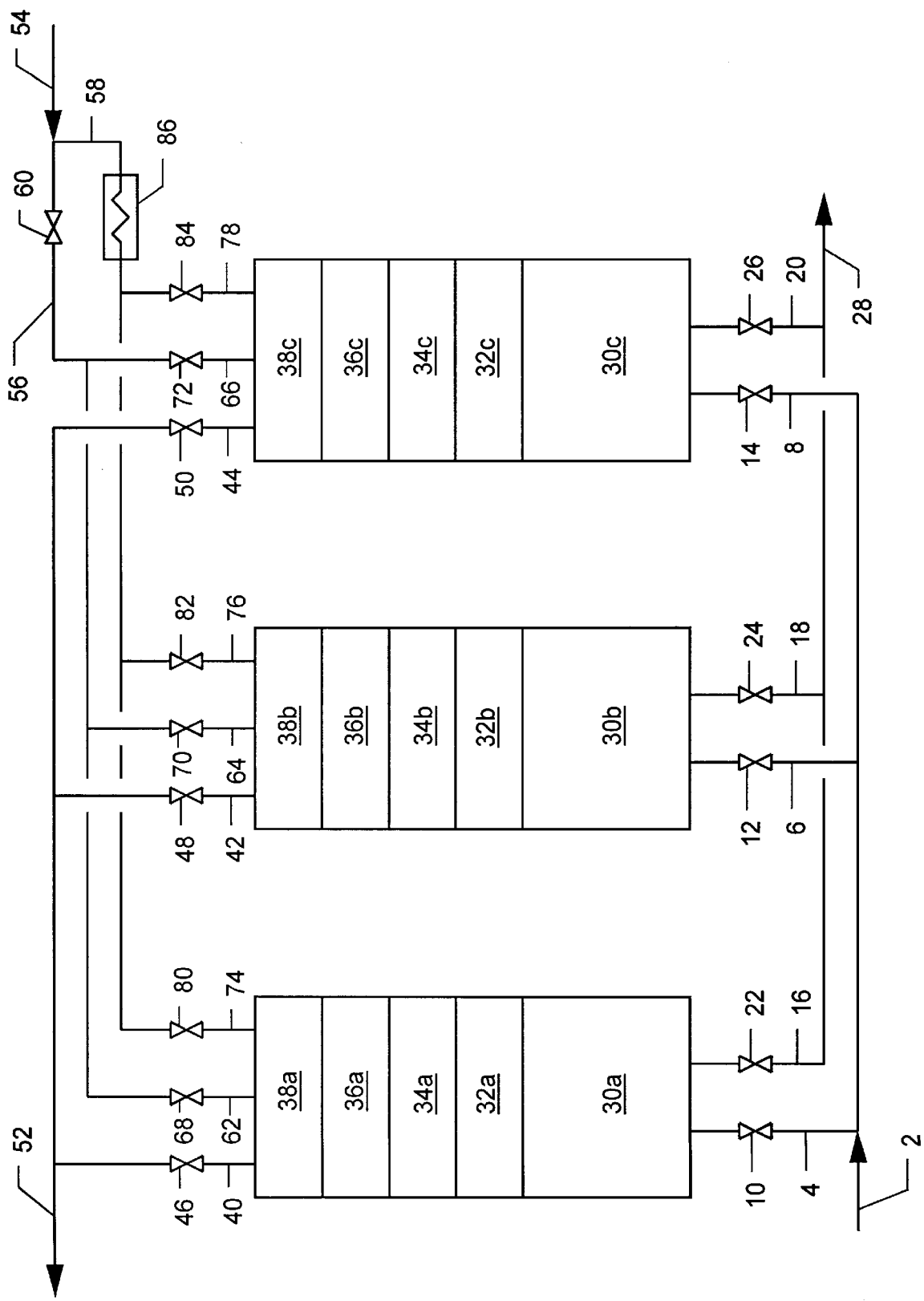

AIR PURIFICATION PROCESS

FIELD OF THE INVENTION

This invention relates to the purification of gas streams and more particularly to the removal of carbon dioxide and water vapor from gas streams by adsorption. Specifically, the invention relates to the purification of air by the removal of water vapor and carbon dioxide therefrom by a combination of pressure swing adsorption (PSA) and temperature swing adsorption (TSA).

BACKGROUND OF THE INVENTION

In many industrial processes using a gaseous feed stream it is desirable or necessary to remove carbon dioxide from the gaseous feed stream prior to certain steps of the process. For example, in the separation of atmospheric air into its component parts by cryogenic distillation; it is necessary to prepurify the air by removing carbon dioxide and water vapor from the air feed prior to refrigerating the air; otherwise, these gases would condense and freeze in the refrigeration heat exchange equipment and eventually clog the equipment, thereby necessitating removal of the equipment from service for removal of the frozen carbon dioxide and ice. The carbon dioxide and water vapor can be removed from the air by a number of techniques.

One well known method of removing carbon dioxide and water vapor from gas streams is by the use of pairs of reversing heat exchangers that are operated alternately, such that one heat exchanger is in purification service while the other is undergoing frozen carbon dioxide and ice removal. Specifically, in this method the gas feed is passed through one heat exchanger in exchange with a refrigerant, which causes the carbon dioxide and water vapor to freeze onto the surfaces of the heat exchanger. When the buildup of frozen carbon dioxide and ice in the heat exchanger reaches a certain level, the heat exchanger is taken out of service to remove, by sublimation and melting, the frozen carbon dioxide and ice. The other heat exchanger of the pair, from which frozen carbon dioxide and ice have been removed, is then placed into purification service. This method has the disadvantage that a considerable amount of purge gas is required to remove the frozen carbon dioxide and ice.

A popular method of removing carbon dioxide and water vapor from gas streams is adsorption. One common adsorption method used for air prepurification is PSA using two serially-connected adsorption layers, the first layer containing a desiccant, such as silica gel or activated alumina for water vapor removal, and the second layer containing a carbon dioxide-selective adsorbent, such as sodium-exchanged type X zeolite (13X zeolite). Typical two-layer air prepurification PSA processes are described in U.S. Pat. Nos. 5,110,569 and 5,156,657, the disclosures of which are incorporated herein by reference. This method has a number of disadvantages. It is difficult to desorb carbon dioxide from the 13X zeolite. The zeolite develops "cold spots" in the upstream region of the layer of zeolite adsorbent and the adsorbent loses some of its adsorption capacity with time. TSA has also been practiced using this combination of layers. U.S. Pat. No. 5,110,569, mentioned above, shows such a process. A major disadvantage of the described TSA process is that a great quantity of heat energy is required in the adsorbent regeneration step, since both layers must be heated sufficiently to drive off the adsorbed moisture and carbon dioxide.

Air prepurification by PSA has also been practiced using a single bed of adsorbent which removes both water vapor and carbon dioxide. Such a process is disclosed in U.S. Pat. No. 5,232,474, the disclosure of which is incorporated herein by reference. The principal disadvantages of this method of air prepurification are that it is difficult to efficiently produce high purity air (air containing less than 1 ppm carbon dioxide) by this method, and a high volume of purge gas is required to effect adequate adsorbent regeneration Japanese Patent Publication No. Sho 55-27034 discloses an air purification process in which moisture and carbon dioxide are removed from air by a combination of PSA and TSA in an adsorption system comprising three adsorption vessels arranged in parallel. Each of the vessels contains a synthetic zeolite adsorbent. At any given time during the process two of the adsorption vessels are operated in an alternating PSA cycle while the adsorbent in the third vessel is thermally regenerated. Following regeneration of the adsorbent in the third vessel one of the other two is taken out of PSA service and thermally regenerated and the freshly regenerated vessel is put into PSA service with the other vessel that was in PSA service. This procedure is repeated continuously throughout the air purification process.

Methods of producing air containing very low levels of water vapor and carbon dioxide are continuously sought. The present invention provides a method which accomplishes this, and does so with low energy and capital expenditures

SUMMARY OF THE INVENTION

In its broadest aspect the invention comprises a method of removing water vapor and carbon dioxide from a gas in a system comprised of first, second and third adsorption sections arranged in parallel. At any given time during the process a non-steady state PSA cycle is practiced in two of the vessels, while the adsorbent in the third vessel is thermally regenerated to drive off carbon dioxide and water vapor (if any) remaining in the adsorbent from the previous PSA cycle. Periodically, one of the vessels in the PSA cycle is taken out of service and replaced by the thermally regenerated vessel. Throughout the process, the three vessels are rotated through the above cycle on a regular basis.

Each section of the system has a first adsorption zone containing activated alumina absorbent and a second adsorption zone positioned downstream of the first adsorption section and containing a carbon dioxide-selective adsorbent other than activated alumina. Specifically the process of the invention comprises repeatedly performing the steps:

(a) subjecting the gas being treated to a cyclic non-steady state PSA process comprising alternating adsorption steps and adsorbent regeneration steps in the first and second adsorption sections, thereby removing substantially all of the water vapor and carbon dioxide from the gas, while desorbing water vapor and carbon dioxide from the adsorbent in the first and second zones of the third adsorption section by heating the adsorbent. In the PSA process the two sections are operated 180° out of phase, so that one section is in the adsorption mode while the other is in the adsorbent regeneration mode.

(b) subjecting the gas to the above-described non-steady state PSA process in the first and third adsorption sections, thereby removing substantially all of the water vapor and carbon dioxide from the gas, while desorbing water vapor and carbon dioxide from the adsorbent in the first and second zones of the second adsorption section by heating the adsorbent.

(c) subjecting the gas to the above-described non-steady state PSA process in the second and third adsorption sections, thereby removing substantially all of the water vapor and carbon dioxide from the gas, while desorbing water vapor and carbon dioxide from the adsorbent in the first and second zones of the first adsorption section by heating the adsorbent.

The adsorption steps of the PSA cycle are generally carried out at a pressure in the range of about 1.5 to about 30 bara, and are preferably carried out at a pressure in the range of about 3 to about 30 bara. The adsorbent regeneration steps of the PSA cycle are generally carried out at a pressure in the range of about 0.15 to about 2 bara, and are preferably carried out at a pressure in the range of about 0.3 to about 2 bara. The adsorption and adsorbent regeneration steps are generally carried out at a temperature in the range of about 0 to about 60° C. The thermal regeneration step is generally carried out at a temperature in the range of about 75 to about 300° C., and is preferably carried out at a temperature in the range of about 100 to about 250° C.

The duration of each of steps (a), (b) and (c) is generally in the range of about 4 hrs to about 16 hrs.

The process of the invention is particularly useful for removing carbon dioxide and, if present, water vapor from air, for example atmospheric air.

Carbon dioxide-selective adsorbents suitable for use in the invention include sodium type X zeolite, calcium type X zeolite, alkali-washed activated alumina and mixtures of these. A preferred carbon dioxide-selective adsorbent is sodium type low silicon X zeolite (NaLSX) having a silicon to aluminum ratio in the range of about 0.95 to 1.05 and particularly about 1.0.

When air is purified by the process of the invention, the substantially water vapor-free and carbon dioxide-free air can be separated by cryogenic distillation process, to produce one or both of a nitrogen-enriched product and an oxygen-enriched product. In this case, it is advantageous to use a waste gas stream from the cryogenic distillation process to purge the adsorbent in the first and second adsorption zones during at least part of the adsorbent regeneration steps. The waste gas stream from the distillation process can also be used to purge the adsorbent in the first and second adsorption zones during at least part of the thermal regeneration step.

The gas being treated may contain hydrogen as an impurity. The hydrogen can be removed by passing the gas through a zone containing a hydrogen oxidation catalyst positioned between the first and second zones, which converts the hydrogen to water vapor. The gas may alternatively, or additionally contain carbon monoxide as an impurity. The carbon monoxide can be removed by passing the gas through a zone containing a carbon monoxide oxidation catalyst positioned between the first and second zones, thereby converting the carbon monoxide to carbon dioxide. The water vapor and/or carbon dioxide produced in the reaction are removed by the second carbon dioxide-selective adsorbent.

BRIEF DESCRIPTION OF THE DRAWING

The drawing FIGURE is a schematic representation of a system in which a preferred embodiment of the invention is carried out. Valves, lines and equipment that are not necessary for an understanding of the invention have not been included in the drawing.

DETAILED DESCRIPTION OF THE INVENTION

PSA is a well known process for separating the components of a mixture of gases by virtue of the difference in the degree of adsorption among them on a particulate adsorbent. Typically, this process is carried out in one or more beds which are operated in a cycle which includes an adsorption step and a bed regeneration step. The process is often carried out in pairs of adsorbent beds arranged in parallel and cycled 180° out of phase, such that one bed is in the adsorption mode while the other bed is undergoing bed regeneration. This provides a pseudo-continuous flow of the desired product or products, which may be obtained during either or both phases of the process. The adsorption step may be carried out at atmospheric pressure, but is generally carried out at superatmospheric pressure, and the desorption or bed regeneration step is carried out at a relatively low pressure or under a vacuum. The PSA cycle may contain other steps in addition to the fundamental steps of adsorption and regeneration, such as pressure equalization between a bed which has just completed its adsorption step and another bed which has just completed its bed regeneration step, and partial repressurization with product gas following bed regeneration or bed equalization.

As used herein to describe the condition of a gas stream, the terms "substantially water vapor-free" or "substantially free of water vapor" mean that the gas stream contains not more than about 1 ppm water vapor. Similarly, the terms "substantially carbon dioxide-free" or "substantially free of carbon dioxide" mean that the gas stream being described contains not more than about 1 ppm carbon dioxide. When "substantially all" of the water vapor and/or "substantially all" of the carbon dioxide are removed from a gas, the gas is substantially free of water vapor and/or substantially free of carbon dioxide.

The invention will be described as it applies to the prepurification of air by the removal of water vapor and carbon dioxide and, optionally, hydrocarbons, hydrogen and carbon monoxide therefrom, however it is to be understood that the process can be used for the purification of any gas by the removal of carbon dioxide therefrom, where the carbon dioxide is more strongly adsorbed by the adsorbent that is used than is the gas to be purified. The invention can be best understood upon consideration of the appended drawing, which shows a system comprising a trio of adsorption vessels, A, B and C, arranged in parallel.

In the drawing, line 2 is connected to a source of air. At a point upstream of the system illustrated in the drawing, line 2 may be provided with a compressor and a cooler/moisture condenser (not shown). On its downstream end line 2 is connected to lines 4, 6 and 8, which are provided with valves 10, 12 and 14, respectively. These valve s control flow of feed gas into vessels A, B and C. Adsorbed gas discharge lines 16, 18 and 20, provided with valves 22, 24 and 26, respectively, are also connected to the inlet end of vessels A, B and C. Lines 16, 18 and 20 are connected to gas discharge line 28, which may vent directly to the atmosphere or may be connected to the inlet end of a vacuum pump (not shown), which, in turn, is in communication with a downstream application or an atmospheric vent.

Vessels A, B and C each have first adsorbent layers 30a, 30b and 30c, which comprise activated alumina. The activated alumina layer is used for removing most of the water and some or most of the carbon dioxide. Positioned in vessels A, B and C above layers 30a, 30b and 30c are optional layers 32a, 32b and 32c, respectively, which comprise an adsorbent selective for hydrocarbons such as propane, propylene and ethylene, for example 4A or 5A zeolite or activated carbon.

Vessels A, B and C may also contain carbon monoxide oxidation catalyst layers 34a, 34b and 34c, which may be upstream or downstream of hydrogen oxidation layers 36a, 36b and 36c, when these layers are present. The hydrogen oxidation catalyst and the carbon monoxide oxidation layer can be combined as a single mixed layer, if desired. The carbon monoxide oxidizing agent may be, for example, a metal oxide such as nickel oxide, copper oxide, manganese dioxide or a mixtures of two or more of these. Furthermore, the metal oxide may be supported on a porous substrate. The preferred metal oxide catalyst is a mixture of copper oxide and manganese dioxide.

Vessels A, B and C also optionally contain hydrogen oxidation catalyst layers 36a, 36b and 36c, which are shown positioned above optional layers 34a, 34b and 34c, respectively. These catalysts may be noble metal-based materials, such as palladium- or platinum-based compositions, and, if desired, they may be mounted on an inert support, such as alumina.

Also contained in vessels A, B and C, downstream of the hydrogen and carbon monoxide oxidation catalyst layers 36a, 36b and 36c (when these are present), are carbon dioxide-selective adsorbent layers 38a, 38b and 38c, respectively. These adsorbent layers are intended to adsorb any carbon dioxide that passes through the activated alumina layer in vessels A, B and C and any carbon dioxide and water vapor produced by the oxidation of carbon monoxide and hydrogen in optional layers 34a, 34b, 34c, 36a, 36b and 36c. Suitable carbon dioxide-selective adsorbents include the alkali-washed activated aluminas such as selexsorb® COS from Alcoa Chemical, and sodium-exchanged type X zeolite. The preferred carbon dioxide adsorbent is sodium-exchanged LSX, i.e. sodium-exchanged type X zeolite having a silicon-to-aluminum atomic ratio in the range of about 0.95 to about 1.1.

The height of the $CO_2$ adsorbent layer can be reduced significantly (reducing the cost and regeneration requirements for this layer) by using an adsorbent with high $CO_2$ capacity at a very low $CO_2$ partial pressure. Experiments were run with 10 ppm $CO_2$ in nitrogen at a pressure of 35 psig, a temperature of 35° C. and a flow rate of 100 SCFH. The bed diameter was 1.625" and the bed length was 18". $CO_2$ capacities for various adsorbents for these conditions are listed below.

| Adsorbent | $CO_2$ Capacity, wt % |
| --- | --- |
| UOP 4A zeolite (8 × 12 mesh) | 0.14 |
| UOP 13X zeolite (8 × 12 mesh) | 0.20 |
| 13X zeolite with Si/Al = 1.25 (8 × 12 mesh), NaMSX | 0.65 |
| 13X zeolite with Si/Al = 1.00 (8 × 12 mesh), NaLSX | 1.00 |
| Alkali-washed activated alumina (7 × 14 mesh), Alcoa Selexsorb ® COS | 1.20 |

The last three adsorbents are the preferred adsorbents for the carbon dioxide layer of this invention.

The outlet ends of vessels A, B and C are connected to product gas discharge lines 40, 42 and 44, which are provided with valves 46, 48 and 50, respectively. Lines 40, 42 and 44 are connected to product line 52. Purge gas line 54, which is connected to a source of purge gas, such as a waste gas stream from a downstream cryogenic distillation unit, is also connected to PSA regeneration purge gas line 56 and thermal regeneration purge gas line 58. Line 56, which is provided with valve 60, communicates with the outlet ends of vessels A, B and C through lines 62, 64 and 66, respectively. Lines 62, 64 and 66 are provided with valves 68, 70 and 72. Line 58 passes through heater 86 and is connected to the outlet ends of vessels A, B and C, through lines 74, 76 and 78, respectively. Lines 74, 76 and 78 are provided with valves 80, 82 and 84, respectively.

Vessels A, B and C may be provided with support screens (not shown) positioned beneath layers 30a, 30b and 30c and top screens (not shown) positioned above layers 38a, 38b and 38c. The support screens are typically displaced from the bottom of vessels A, B and C to provide gas distribution chambers for the feed gas entering these vessels. Gas collection spaces are typically provided above the top screens.

The various layers are preferably contained in single vessels, as shown in the drawing, although each layer or selected groups of layers may be contained in separate vessels, if desired.

The activated alumina in layers 30a, 30b and 30c serves to remove substantially all of the moisture and a considerable portion of the carbon dioxide that is contained in the gas being treated, and, as noted above, the adsorbent in layers 38a, 38b and 38c serves to remove all remaining carbon dioxide, including carbon dioxide produced by the catalytic oxidation of carbon monoxide in layers 36a, 36b and 36c and any moisture produced by the oxidation of hydrogen in layers 34a, 34b and 34c. It is desirable to remove all free moisture contained in the incoming feed gas in layers 30a, 30b and 30c to permit the use of a small bed of highly efficient carbon dioxide-selective adsorbent in layers 38a, 38b and 38c. It is even more important to remove substantially all moisture from the incoming gas when the adsorption vessels contain hydrogen and/or carbon monoxide oxidation layers, because moisture causes degradation of the catalysts used in these layers.

In the system used for the process described below, each of vessels A, B and C contains a first layer of activated alumina, a second layer of activated carbon, a third layer comprising a carbon monoxide oxidation catalyst such as Carulite-300 from Carus Chemical, a fourth layer of palladium-coated alumina and a fifth layer of alkali-washed alumina or sodium LSX zeolite. The duration of each cycle of the PSA stage is, at most, several minutes, while the duration of the thermal regeneration is generally several hours; accordingly, during any single phase of the process the two vessels in the PSA mode will undergo many PSA alternations while the third vessel undergoes a single thermal regeneration step. For purposes of description, it will be assumed that the PSA process is carried out with pressurization to superatmospheric pressure during the adsorption step and reduction of pressure to atmospheric pressure during the bed regeneration step. The pressure in the vessel undergoing thermal regeneration is assumed to be at or near atmospheric pressure.

The process described below comprises three phases; a first phase, in which vessels A and B are initially operating in an alternating non-steady state PSA cycle and the adsorbent in vessel C is undergoing thermal regeneration; a second phase, in which vessels A and C are operating in an alternating non-steady state PSA cycle while the adsorbent in vessel B undergoes thermal regeneration; and a third phase, in which vessels B and C are operating in an alternating non-steady state PSA cycle while the adsorbent in vessel A undergoes thermal regeneration.

At the start of stage 1 of the first phase of the process, one of vessels A or B, for example vessel A, is in the adsorption mode and the other vessel (vessel B) is in the adsorbent regeneration mode. With vessel A starting in the adsorption mode, valves 10, 24, 26, 60, 82 and 84 are initially open and all other valves are closed. Atmospheric air is compressed and cooled and introduced into vessel A through lines 2 and 4. When the pressure in vessel A reaches the desired adsorption pressure, valve 46 is opened and gas flows through vessel A at the selected adsorption pressure. As the feed air passes cocurrently (in the direction from the feed end towards the nonadsorbed gas outlet end of the vessels) through layer 30*a*, substantially all water vapor (if the air contains any) and part of the carbon dioxide contained in the air are adsorbed by the activated alumina. The air passes out of layer 30*a* substantially free of water vapor and containing a small amount of carbon dioxide and it next passes through layer 32*a* which removes any hydrocarbons such as ethylene, propylene or propane from the gas. It then passes through layers 34*a* and 36*a*, and as it does so, any hydrogen and carbon monoxide that is present in the air is oxidized to water vapor and carbon dioxide. The air then passes through carbon dioxide adsorbent layer 38*a* containing, for example, sodium LSX, which removes all water vapor generated in layer 34*a* and all carbon dioxide remaining in the gas. The purified air, now substantially free of hydrogen, water vapor, carbon monoxide and carbon dioxide, passes out of vessel A through line 40 and leaves the system through line 52.

Meanwhile, regeneration purge gas that is free of moisture carbon dioxide and hydrocarbons is introduced into the system through line 54. As noted above, the regeneration gas may be a waste stream from a downstream cryogenic distillation unit or from other air separation equipment. Part of the regeneration gas flows through line 56, and then flows countercurrently (in the direction opposite to the flow of feed gas through the vessels) through the layers of adsorbent and catalyst in vessel B. As it passes through layer 38*b* it desorbs at least part of the water vapor and carbon dioxide contained in this layer. The gas then flows through layers 36*b* and 34*b* and then through layer 32*b*, where it desorbs hydrocarbons accumulated in the activated carbon, then through layer 30*b*, where it desorbs water vapor and carbon dioxide from the alumina adsorbent. The purge gas, together with the gas components desorbed from the adsorbents in vessel B, pass out of vessel B and leave the system through lines 18 and 28. Although not necessary, the purge gas may be heated prior to its use in the PSA process.

The remainder of the purge gas entering the system through line 54 flows through line 58, is heated in heater 86 and then flows countercurrently through the layers in vessel C. As the heated purge gas passes through the layers in vessel B, it desorbs from the various layers the residual carbon dioxide, water vapor and/or hydrocarbons from different layers that have gradually built up in this vessel over the previous two PSA stages carried out in this vessel. The regeneration gas, together with the desorbed carbon dioxide, water vapor and hydrocarbons, leaves vessel C through line 20 and exits the system through line 28.

As the PSA adsorption step proceeds, the adsorption fronts in layers 30*a*, 32*a* and 38*a* advance toward the outlet end of these layers. Prior to breakthrough of the sorbed gases from these layers, stage 1 of the first phase of the PSA cycle is terminated and stage 2 of the first phase begins.

During stage 2, vessel B, which has completed its PSA adsorbent regeneration phase, is put into adsorption service and the adsorbents in vessel A are regenerated. The changeover is accomplished by having open valves 12, 22, 26, 60, 80 and 84 and having all other valves closed. Atmospheric air is compressed and cooled and introduced into vessel B through lines 2 and 6. When the pressure in vessel B reaches the desired adsorption pressure, valve 48 is opened and gas flows through vessel A. Feed air now passes cocurrently through layers 30*b*, 32*b*, 34*b*, 36*b* and 38*b* which remove substantially all water vapor, hydrocarbons, carbon monoxide, hydrogen, and carbon dioxide from the air. The dry purified air next passes out of vessel B through line 42 and leaves the system through line 52, as in stage 1 of this first phase of the process. Also during this stage 2 of phase 1, regeneration gas flows through lines 54, 56, 62 and countercurrently through the layers of adsorbent and catalyst in vessel A, whereupon it desorbs hydrocarbons from layer 32*a* and water vapor and carbon dioxide from layers 38*a* and 30*a*. The purge gas, together with the gas components desorbed from vessel A, passes out of vessel A through line 16 and leaves the system through line 28.

Upon completion of stage 2 of the first phase, stage 1 of this phase begins again. This procedure is continuously repeated during the first phase. Thermal regeneration of vessel C continues for the duration of this phase.

As the PSA cycle proceeds in vessels A and B, water vapor and/or carbon dioxide gradually build up in 30*a* and 30*b* and/or in 38*a* and 38*b*, and the level of hydrocarbon may build up in layers 32*a* and 32*b*. The buildup will be more advanced in the layers of vessel A, which has been in continuous PSA service longer than vessel B. When the buildup of these components in one or more of the vessel A layers reaches the point where it threatens to adversely affect the efficiency of the gas purification process, the first phase of the process is terminated and the second phase is started.

The gradual build-up of residual carbon dioxide results from the non-steady state PSA cycle that is being carried out. By "non-steady state PSA process" is meant that the PSA process is carried out in an adsorption vessel under conditions such that the amount of carbon dioxide remaining on the adsorbent in the vessel upon completion of the adsorbent regeneration step of a given PSA cycle ("residual carbon dioxide") is greater than the amount of residual carbon dioxide remaining on the adsorbent in that vessel upon completion of the adsorbent regeneration step of the PSA cycle immediately preceding the given PSA cycle. While carbon dioxide removal during PSA regeneration cycle is non-steady state, water removal is expected to be under steady state (no water build-up between cycles) since the amount of purge gas needed for water removal is much smaller than that needed for steady state removal of carbon dioxide. Non-steady state operation results, for example, by using less purge gas than is necessary to regenerate the adsorbent to the extent necessary to maintain steady state operation, i.e. to reduce the residual carbon dioxide to approximately the same extent in each cycle of the PSA process, or by not evacuating the adsorption vessel sufficiently during adsorbent regeneration to maintain steady state operation. The advantages of operating the PSA cycle on a non-steady state basis are that smaller adsorption beds can be used in the process, regeneration energy savings are realized and less regeneration gas is required because the beds are not regenerated to the full extent during the PSA cycles of the process.

During the second phase of the process vessels B and C are in alternating PSA service and the adsorbents in vessel A undergo thermal regeneration.

At the start of stage 1 of the second phase of the process, one of vessels B or C, for example vessel B, is in the adsorption mode and the other vessel (vessel C) is in the adsorbent regeneration mode. With vessel B in the adsorption mode, valves 12, 22, 26, 60, 80 and 84 are initially open and all other valves are closed. Atmospheric air is compressed and cooled and introduced into vessel B through lines 2 and 6. When the pressure in vessel B reaches the desired adsorption pressure, valve 48 is opened and gas flows through vessel B at the adsorption pressure. The feed air now passes cocurrently through vessel B, and as it does so water vapor, hydrocarbons, hydrogen, carbon monoxide and carbon dioxide are removed therefrom. The purified air passes out of vessel B through line 42 and leaves the system through line 52.

Meanwhile, regeneration gas that is free of moisture, carbon dioxide and hydrocarbons continues to flow into the system through line 54. Part of the regeneration gas flows through line 56, and then flows countercurrently through the layers of adsorbent and catalyst in vessel C. As it passes through vessel C it sweeps water vapor and carbon dioxide from the adsorbent in layers 38b and 30b and hydrocarbons from the adsorbent in layer 32b The purge gas, together with the gas components desorbed from the adsorbents in vessel C, passes out of vessel C and leaves the system through lines 20 and 28.

The remainder of the purge gas entering the system through line 54 flows through line 58, is heated in heater 86 and then flows countercurrently through the layers in vessel A. As the heated purge gas passes through vessel A, it desorbs residual carbon dioxide and water vapor from layers 38a and 30a and residual hydrocarbons from layer 32a. The regeneration gas, together with any desorbed carbon dioxide, water vapor and hydrocarbons, leaves vessel A through line 16 and exits the system through line 28.

When the adsorption fronts in one or more of layers 30b, 32b and 38b reach the desired end point, prior to breakthrough, stage 1 of the second phase of the PSA cycle is terminated and the second phase stage 2 begins.

During stage 2, vessel C, which has completed its PSA adsorbent regeneration phase, is put into adsorption service and the adsorbents in vessel B are regenerated. The changeover is accomplished by initially having open valves 14, 22, 24, 60, 80 and 82 and all other valves are closed. Atmospheric air is compressed and cooled and introduced into vessel B through lines 2 and 8. When the pressure in vessel B reaches the desired adsorption pressure, valve 50 is opened and gas flows through vessel C at the adsorption pressure. Feed air now passes cocurrently through layers 30c, 32c, 34c, 36c and 38c, which remove substantially all water vapor, hydrocarbons, carbon monoxide, hydrogen, and carbon dioxide from the air. The dry purified air passes out of vessel C through line 44 and leaves the system through line 52. Also during this stage 2 of phase 2, regeneration gas flows through lines 54, 56, 64 and countercurrently through the layers of adsorbent in vessel B, whereupon it desorbs hydrocarbons from layer 32b and water vapor and carbon dioxide from layers 38b and 30b. The purge gas, together with the gas components desorbed from vessel B, passes out of vessel B through line 18 and leaves the system through line 28.

Upon completion of stage 2 of the second phase, stage 1 begins again. This procedure is continuously repeated during the second phase. Thermal regeneration of vessel A continues for the duration of the second phase.

As the PSA cycle proceeds in vessels B and C, water vapor and/or carbon dioxide gradually build up in 30b and 30c and/or in 38b and 38c, and the level of hydrocarbon may build up in layers 32b and 32c. The buildup will be more advanced in vessel B, which has been in continuous PSA service longer than vessel C. When the buildup of these components in one or more of the vessel B layers reaches the point where it threatens to adversely affect the efficiency of the gas purification process, the second phase of the process is terminated and the third phase is started.

During the third phase of the process vessels A and C are in PSA service and the adsorbent in vessel B undergoes thermal regeneration.

In stage 1 of the third phase of the process, one of vessels A or C, for example vessel C, is in the adsorption mode and the other vessel (vessel A) is in the adsorbent regeneration mode. With vessel C starting in the adsorption mode, valves 14, 22, 24, 60, 80 and 82 are initially open and all other valves are closed. Atmospheric air is compressed and cooled and introduced into vessel C through lines 2 and 8. When the pressure in vessel C reaches the desired adsorption pressure, valve 50 is opened and gas flows through vessel C at the adsorption pressure. The feed air now passes cocurrently through vessel C, and as it does so, water vapor, hydrocarbons, hydrogen, carbon monoxide and carbon dioxide are removed therefrom. The purified air passes out of vessel B through line 44 and leaves the system through line 52.

Meanwhile, regeneration gas that is free of moisture, carbon dioxide and hydrocarbons continues to flow into the system through line 54. Part of the regeneration gas flows through lines 56 and 74, and then flows countercurrently through the layers of adsorbent and catalyst in vessel A. As it passes through vessel A it sweeps water vapor, carbon dioxide from the adsorbent in layers 38a and 30a and hydrocarbons from the adsorbent in layer 32a. The purge gas, together with the gas components desorbed from the adsorbents in vessel A, passes out of vessel A and leaves the system through lines 16 and 28.

The remainder of the purge gas entering the system through line 54 flows through line 58, is heated in heater 86 and then flows countercurrently through the layers in vessel B. As the heated purge gas passes through vessel B, it desorbs residual carbon dioxide and water vapor from layers 38b and 30b and residual hydrocarbons from layer 32b. The regeneration gas, together with the desorbed carbon dioxide and water vapor, leaves vessel B through line 18 and exits the system through line 28.

When the adsorption fronts in one or more of layers 30c, 32c and 38c reach the desired end point, prior to breakthrough, stage 1 of the third phase of the PSA cycle is terminated and the third phase stage 2 begins.

During stage 2, vessel A, which has completed its PSA adsorbent regeneration phase, is put into adsorption service and the adsorbents in vessel C are regenerated. The changeover is accomplished by initially having open valves 10, 24, 26, 60, 82 and 84 and all other valves are closed. Atmospheric air is compressed and cooled and introduced into vessel A through lines 2 and 4. When the pressure in vessel A reaches the desired adsorption pressure, valve 46 is opened and gas flows through vessel A at the adsorption pressure. Feed air now passes cocurrently through layers 30a, 32a, 34a, 36a and 38a, which remove substantially all water vapor, hydrocarbons, carbon monoxide, hydrogen, and carbon dioxide from the air. The dry purified air next passes out of vessel A through line 40 and leaves the system through line 52. Also during this stage 2 of phase 3, regeneration gas flows through lines 54, 56, 66 and countercurrently through the layers of adsorbent in vessel C, whereupon it desorbs hydrocarbons from layer 32c and water vapor and carbon dioxide from layers 38c and 30c. The purge gas, together with the gas components desorbed from vessel C, passes out of vessel C through line 20 and leaves the system through line 28.

Upon completion of stage 2 of the third phase, stage 1 begins again. This procedure is continuously repeated during the third phase. Thermal regeneration of vessel B continues for the duration of the third phase.

As the PSA cycle proceeds in vessels A and C, water vapor and/or carbon dioxide gradually build up in 30a and 30c and/or in 38a and 38c, and the level of hydrocarbons may build up in layers 32a and 32c. The buildup will be more advanced in vessel C, which has been in continuous PSA service longer than vessel A. When the buildup of these components in one or more of the vessel C layers reaches the point where it threatens to adversely affect the efficiency of the gas purification process, the third phase of the process is terminated and the first phase is started over again. The above-described cycle continues throughout the run.

Thermal regeneration of the adsorbent beds of this invention removes impurities which accumulate due to non-steady state operation of the PSA beds and the impurities that are not removed in the PSA regeneration. These include carbon dioxide in activated alumina layer which accumulates during the PSA operation, hydrocarbons in the hydrocarbon layer, chemisorbed impurities in the catalyst layer and $CO_2/H_2O$ impurities in the top carbon dioxide layer. There may be a small heel of water left in the activated alumina layer during PSA operation but there should not be any build-up of water during PSA operation. The thermal regeneration of the beds may be stopped before the water remaining in the activated alumina layer starts desorbing.

Compared to a standard TSA process this process does not need thermal energy for the removal of water adsorbed on activated alumina layer which constitutes a significant portion of the overall energy requirement. Also, energy required for $CO_2$ removal is substantially reduced. Compared to a standard PSA process, this process has a significantly higher sieve specific product which reduces both the vessel size and vent loss leading to substantial savings. Compared to the three bed process described in Japanese Patent Sho 55-27034, the sieve specific product of this process is higher, leading to capital and power savings. Also, this process provides for the removal of carbon monoxide, hydrogen and hydrocarbons impurities not provided for in Sho 55-27034.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE 1 (COMPARATIVE)

Experiments were carried out using activated alumina H-156 from Alcoa Chemical Co. in 7×14 mesh size. A bed with a cross-sectional area of 0.1 $ft^2$ was filled with 65 inches of this adsorbent. Steady state PSA experiments were carried out with feed air at 85 psia and 40° C. containing 350 ppm carbon dioxide and saturated with water vapor. The PSA cycle used was as follows:

| Step | Time |
| --- | --- |
| Bed pressurization with impurity-free gas | 240 sec |
| Air purification | 900 sec |
| Depressurization | 48 sec |
| Purge with impurity free gas | 612 sec |
| Cycle Time | 30 minutes |

Nitrogen free of $CO_2$ and $H_2O$ impurities was used for both the bed pressurization step and the purge step. The ratio of purge flow (in std cubic ft per min) to feed flow (in std cubic ft per min) was 0.5. The standard conditions refer to a temperature of 70° F. and a pressure of one atm. For about 5 ppb $CO_2$ in the product at steady state, the sieve specific product defined as air flow/amount of adsorbent in all the beds was 12 std. $cfm/ft^3$.

EXAMPLE 2

The experiment described in Example 1 was run using the same adsorbent and the same cycle time. Prior to the start of the experiment the bed was thermally regenerated (at 200° C. with 7.5 std cfm nitrogen) to remove any impurities from the bed. The purge flow to the feed flow ratio was the same as in Example 1. For feed air at 85 psia and 40° C. containing 350 ppm carbon dioxide and saturated with water vapor and starting with a thermally regenerated bed, the feed flow rate was varied until the product $CO_2$ concentration at the end of eight hours (16 cycles) was 5 ppb. The sieve specific product in this case (defined as air flow rate/amount of sieve in all three beds) was 18 std $cfm/ft^3$ or about 50% higher than the steady state PSA operation. The vent loss was reduced by more than 65% in this case compared to the steady state PSA case. Product $CO_2$ concentration for the steady state case (Example 1) and the non-steady case of this invention are compared in Table 1.

TABLE I

Comparison of Product $CO_2$ Profiles for Steady and Non-Steady Operation

| Time, hrs | End of Cycle # | Prod. $CO_2$ for Example 1, ppb | Prod. $CO_2$ for Example 2, ppb |
| --- | --- | --- | --- |
| 0.50 | 1 | 5.0 | <1 |
| 1.00 | 2 | 5.0 | <1 |
| 1.50 | 3 | 5.0 | <1 |
| 2.00 | 4 | 5.0 | <1 |
| 2.50 | 5 | 5.0 | <1 |
| 3.00 | 6 | 5.0 | <1 |
| 3.50 | 7 | 5.0 | <1 |
| 4.00 | 8 | 5.0 | <1 |
| 4.50 | 9 | 5.0 | <1 |
| 5.00 | 10 | 5.0 | <1 |
| 5.50 | 11 | 5.0 | <1 |
| 6.00 | 12 | 5.0 | <1 |
| 6.50 | 13 | 5.0 | <1 |
| 7.00 | 14 | 5.0 | 2.0 |
| 7.50 | 15 | 5.0 | 3.0 |
| 8.00 | 16 | 5.0 | 5.0 |

EXAMPLE 3

The bed used in Example 2 was filled with 59" of Alcoa H-156 activated alumina and 6" of 13X zeolite with silicon to aluminum ratio of 1.25 (NaMSX). Prior to the start of the experiment the bed was thermally regenerated (at 200° C. with 7.5 std cfm nitrogen) to remove any impurities from the bed. The bed was operated in the PSA mode with the same cycle as in Example 1. The purge flow to the feed flow ratio (at standard conditions) was 0.34. For feed air at 85 psia and 40° C. containing 350 ppm carbon dioxide and saturated with water vapor and starting with a thermally regenerated bed, the feed flow rate was varied until the product $CO_2$ concentration at the end of eight hours (16 cycles) was 5 ppb. The sieve specific product in this case (defined as air flow rate/amount of sieve in all three beds) was 20 std $cfm/ft^3$. By using a layer of an adsorbent with high $CO_2$ capacity near the bed outlet, an improvement in sieve specific product of over 11% was obtained over Example 2 and an improvement of about 67% was obtained over Example 1.

EXAMPLE 4

The bed in Example 2 was filled with 51" of Alcoa H-156 activated alumina, 4" of Carulite-300 from Carus Chemical, 4" of 0.5%-Pd-on-activated alumina catalyst from Engelhard Corp. and 6" of 13X zeolite with silicon to aluminum ratio of 1.25. Prior to the start of the experiment the bed was thermally regenerated (at 200° C. with 7.5 std cfm nitrogen) to remove any impurities from the bed. The bed was operated in the PSA mode with the same cycle as in Example 1. The purge flow to the feed flow ratio (at standard conditions) was 0.34. For feed air at 85 psia ard 40° C. containing 350 ppm carbon dioxide and saturated with water vapor and starting with a thermally regenerated bed, the feed flow rate was varied until the product $CO_2$ concentration at the end of eight hours (16 cycles) was 5 ppb. The sieve specific product in this case (defined as air flow rate/amount of sieve in all three beds) was 18.5 std cfm/ft$^3$. The product contained less than 5 ppb each of impurities consisting of CO, $CO_2$, $H_2$ and $H_2O$.

This example illustrates the removal of impurities other than $CO_2$ and $H_2O$ by non-steady operation of the 3-bed cycle of this invention.

Although the invention has been described with particular reference to specific equipment arrangements and to specific experiments, these features are merely exemplary of the invention and variations are contemplated. For example, The PSA cycles of the process may include other steps, such as bed equalization and nonadsorbed product gas backfill. Also, the vessels may contain fewer layers, or the order of the layers may be changed, subject to the recommendation that the alumina layer be adjacent the vessel inlets and the carbon dioxide-selective layer be adjacent the vessel outlets. Furthermore, the PSA cycle can be operated in a vacuum swing adsorption (VSA) cycle with adsorption carried out at or above atmospheric pressure and bed regeneration conducted under a vacuum, with or without a purge. The scope of the invention is limited only by the breadth of the appended claims.

What is claimed is:

1. A method of removing water vapor and carbon dioxide from a gas in a system comprised of first, second and third adsorption sections arranged in parallel, each section containing a first zone containing activated alumina adsorbent and a second zone positioned downstream of said first zone and containing a carbon dioxide-selective adsorbent other than activated alumina, comprising repeatedly performing the steps:

(a) subjecting said gas to a cyclic non-steady state pressure swing adsorption process comprising alternating adsorption steps and adsorbent regeneration steps in said first and second adsorption sections, thereby removing substantially all of the water vapor and carbon dioxide from said gas, while desorbing water vapor and carbon dioxide from the adsorbents in the first and second zones of said third adsorption section by heating the adsorbents;

(b) subjecting said gas to a cyclic non-steady state pressure swing adsorption process comprising alternating adsorption steps and adsorbent regeneration steps in said first and third adsorption sections, thereby removing substantially all of the water vapor and carbon dioxide from said gas, while desorbing water vapor and carbon dioxide from the adsorbents in the first and second zones of said second adsorption section by heating the adsorbents;

(c) subjecting said gas to a cyclic non-steady state pressure swing adsorption process comprising alternating adsorption steps and adsorbent regeneration steps in said second and third adsorption sections, thereby removing substantially all of the water vapor and carbon dioxide from said gas, while desorbing water vapor and carbon dioxide from the adsorbents in the first and second zones of said first adsorption section by heating the adsorbents.

2. The method of claim 1, wherein said adsorption steps are carried out at a pressure in the range of about 1.5 to about 30 bara.

3. The method of claim 1 or claim 2, wherein said adsorbent regeneration steps are carried out at a pressure in the range of about 0.15 to about 2 bara.

4. The method of claim 1, wherein said adsorption and adsorbent regeneration steps are carried out at a temperature in the range of about 0 to about 60° C.

5. The method of claim 1 or claim 4, wherein said desorbing is carried out at a temperature in the range of about 75 to about 300° C.

6. The method of claim 1, wherein steps (a), (b) and (c) have durations in the range of about 4 hours to about 16 hours.

7. The method of claim 1, wherein said gas is atmospheric air.

8. The method of claim 7, wherein said carbon dioxide-selective adsorbent is sodium X zeolite, calcium X zeolite, alkali-washed alumina and mixtures of these.

9. The method of claim 7, wherein said carbon dioxide-selective adsorbent is sodium LSX zeolite.

10. The method of claim 7, wherein said adsorption steps are carried out at a pressure in the range of about 3 to about 20 bara, and said adsorbent regeneration steps are carried out at a pressure in the range of about 0.3 to about 2 bara.

11. The method of claim 7 or claim 10, wherein said desorbing is carried out at a temperature in the range of about 100 to about 250° C.

12. The method of claim 1, further comprising subjecting the substantially water vapor-free and carbon dioxide-free air to a cryogenic distillation process, thereby producing one or both of a nitrogen-enriched product and an oxygen-enriched product.

13. The method of claim 12, further comprising purging the adsorbent in said first and second adsorption zones during at least part of said adsorbent regeneration steps with waste gas from said cryogenic distillation process.

14. The method of claim 12 or claim 13, further comprising purging the adsorbents in said first and second adsorption zones during at least part of said desorbing with waste gas from said cryogenic distillation process.

15. The method of claim 1, wherein said gas contains hydrogen as an impurity and wherein said gas is passed through a zone containing a hydrogen oxidation catalyst positioned between said first and second zones, thereby converting the hydrogen to water vapor.

16. The method of claim 1 or claim 15, wherein said gas contains carbon monoxide as an impurity and wherein said gas is passed through a zone containing a carbon monoxide oxidation catalyst positioned between said first and second zones, thereby converting said carbon monoxide to carbon dioxide.

* * * * *